United States Patent
Burkhart et al.

(10) Patent No.: US 7,979,188 B2
(45) Date of Patent: Jul. 12, 2011

(54) METHOD FOR ACTIVATING AND DEACTIVATING THE FOUR-WHEEL DRIVE OF SERVICE AND WORKING VEHICLES WITHOUT INTERACTIVE DIFFERENTIAL LOCKS

(75) Inventors: Hugo Burkhart, Ravensburg (DE); Bernd Aumann, Amtzell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 858 days.

(21) Appl. No.: 11/915,873

(22) PCT Filed: Apr. 29, 2006

(86) PCT No.: PCT/EP2006/004053
§ 371 (c)(1),
(2), (4) Date: Nov. 29, 2007

(87) PCT Pub. No.: WO2006/128537
PCT Pub. Date: Dec. 7, 2006

(65) Prior Publication Data
US 2008/0195288 A1    Aug. 14, 2008

(30) Foreign Application Priority Data
May 31, 2005   (DE) .................. 10 2005 024 757

(51) Int. Cl.
*G06F 17/00* (2006.01)
*B60K 17/34* (2006.01)
(52) U.S. Cl. .............. 701/69; 701/50; 701/70; 180/233; 180/245; 180/247; 74/34

(58) Field of Classification Search ............... 701/69; 180/247
See application file for complete search history.

(56) References Cited

U.S. PATENT DOCUMENTS

| 3,763,948 | A  | * | 10/1973 | Eggleton et al. | 180/247 |
| 4,840,246 | A  |   | 6/1989  | Yamakawa et al. |  |
| 5,802,489 | A  | * | 9/1998  | Orbach et al. | 701/50 |
| 6,466,855 | B2 | * | 10/2002 | Yamaguchi | 701/70 |
| 6,470,659 | B2 | * | 10/2002 | Shimamura et al. | 56/14.7 |
| 6,641,223 | B2 |   | 11/2003 | Kingston |  |
| 6,711,487 | B2 |   | 3/2004  | Murakami et al. |  |
| 2003/0001426 | A1 | * | 1/2003 | Kingston | 298/22 R |
| 2006/0122757 | A1 | * | 6/2006 | Billig | 701/69 |
| 2007/0034441 | A1 | * | 2/2007 | Pelchen et al. | 180/337 |

FOREIGN PATENT DOCUMENTS

| AT | 340 195 |    | 11/1977 |
| DE | 1 813 603 |  | 6/1970 |
| DE | 33 23 820 | A1 | 2/1984 |
| DE | 34 34 395 | A1 | 5/1985 |
| EP | 1 308 337 | A2 | 10/2002 |
| EP | 1308337 | A2 * | 5/2003 |
| FR | 2 486 900 |  | 1/1980 |
| GB | 744546 |  | 2/1956 |

* cited by examiner

*Primary Examiner* — Thomas G Black
*Assistant Examiner* — Lin B Olsen
(74) *Attorney, Agent, or Firm* — Daivs & Bujold, P.L.L.C.

(57) ABSTRACT

A method for activating and deactivating the four-wheel drive of a service or a working vehicle not having interaxle differential locks. According to the method, the activation and deactivation of the four-wheel drive is derived from at least one of the following parameters, namely, the driving and load conditions of the vehicle (1), the vehicle speed and the output torque of the gearbox.

6 Claims, 1 Drawing Sheet

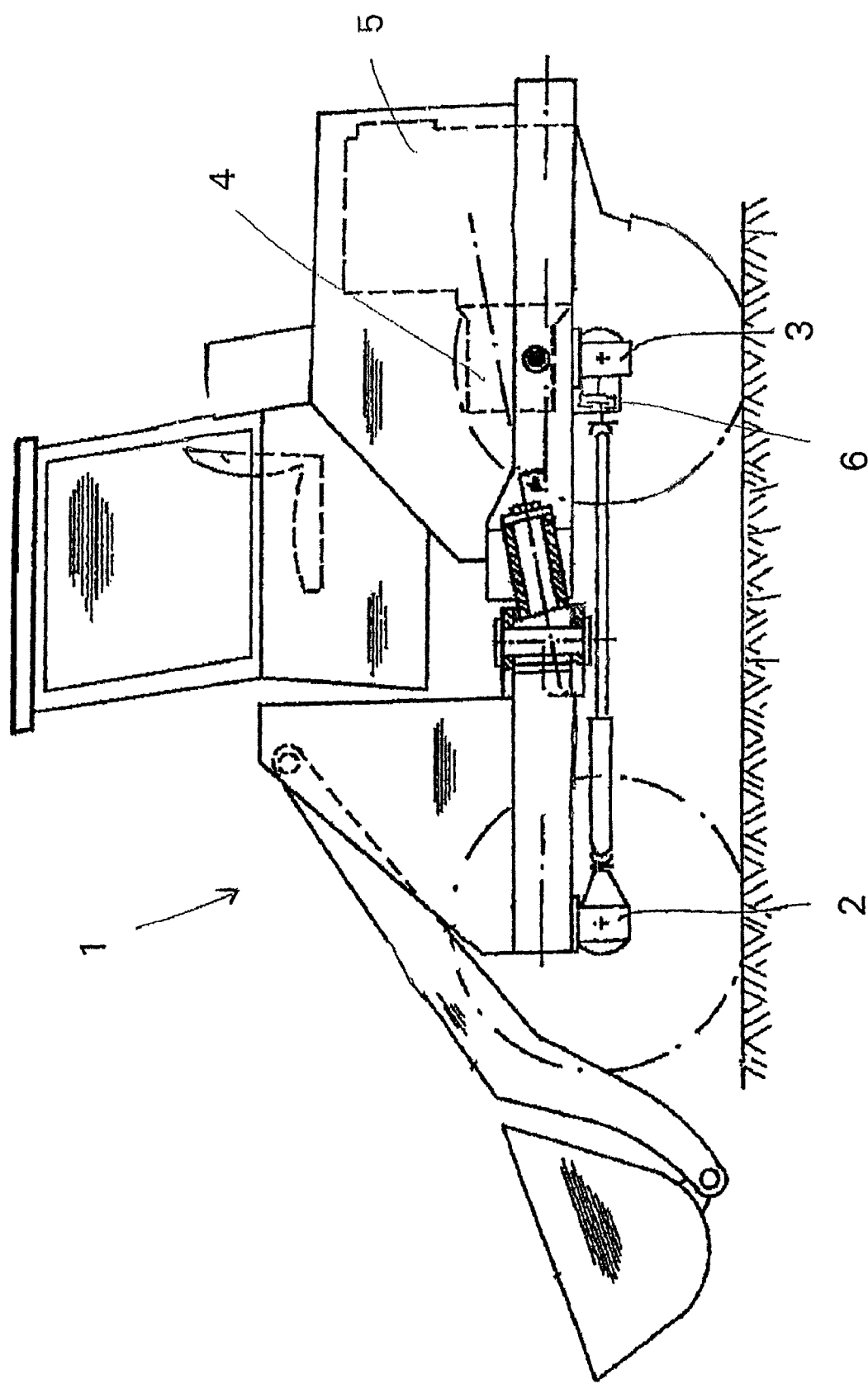

METHOD FOR ACTIVATING AND DEACTIVATING THE FOUR-WHEEL DRIVE OF SERVICE AND WORKING VEHICLES WITHOUT INTERACTIVE DIFFERENTIAL LOCKS

This application is a national stage completion of PCT/EP2006/004053 filed Apr. 29, 2006, which claims priority from German Application Serial No. 10 2005 024 757.1 filed May 31, 2005.

FIELD OF THE INVENTION

The present invention pertains to a method of activating and deactivating the four-wheel drive of service and working vehicles without interaxle differential locks.

BACKGROUND OF THE INVENTION

Traditional center pivot steered construction machines, especially wheel loaders, rocker dump trucks, or wheel-linked farm tractors, construction or special machines, are equipped with load-changeable transmission mechanisms, comprising torque converters or fluid couplings or hydrostatic drives. In most such service and working vehicles, such as the wheel loaders, a permanent four-wheel drive is provided, being realized on the power take-off from the gearbox with a fixed torque distribution between front and rear axle.

The permanent four-wheel drive can have negative effects in some operating conditions. For example, the permanent four-wheel drive can result in an increased fuel consumption, as well as decreased driving features and driving performance. Furthermore, the permanent four-wheel drive can result in a needlessly large mechanical load on the drive components and increased tire wear.

SUMMARY OF THE INVENTION

The basic problem of the present invention is to indicate a method for activating and deactivating the four-wheel drive of service and working vehicles having no interaxle differential locks, which requires already available parameters to accomplish this and has no unfavorable influence on the driving condition of the vehicle, especially in critical situations. Furthermore, the method of the invention should require no additional sensors. Thanks to the method, the activating and deactivating of the four-wheel drive should occur automatically while, in extreme situations, a manual intervention in the system should be possible.

Accordingly, it is proposed to derive the activating and the deactivating of the four-wheel drive, especially for center pivot steered wheel loaders, from the driving and/or load conditions of the vehicle, preferably using the vehicle speed and/or the gearbox output torque as parameter. No interaxle differential locks are required for this; the power distribution on the axles takes on a fixed, predetermined value in the case when the four-wheel drive is activated, which can be 1:1, for example. Positive locking or nonpositive shift elements can be used to accomplish the four-wheel drive, depending on the design.

According to the invention, the four-wheel drive is activated when the vehicle speed drops below a predetermined threshold value $v\_1$ and/or the gearbox output torque rises above a predetermined threshold value $T\_Ab1$.

Furthermore, it is provided that the four-wheel drive is deactivated when the vehicle speed rises above a predetermined threshold value $v\_2$ and/or when the gearbox output torque drops below a predetermined threshold value $T\_Ab2$, where $v\_2$ is larger than $v\_1$ and $T\_Ab2$ is smaller than $T\_Ab1$.

The design, according to the invention, makes a single-axle drive with automatically activated second axle possible. Advantageously, the sensor already present in the gearbox power take-off can be used as an rpm sensor, while the information needed to detect the output torque can be calculated from the available variables of the drive components. For example, the value of the gearbox output torque, required as the parameter, can be determined, for example, from the differential rpm value of the hydrodynamic converter and the engaged gear stage.

In the context of an especially favorable version of the inventive method, it is proposed that the threshold value of the gearbox output torque $T\_Ab1$ can be set by the driver by means of a suitable mechanism, such as a rotary potentiometer in the dashboard, according to the conditions of use of the vehicle. In this way, one can adapt the threshold value $T\_Ab1$ for the gearbox output torque, depending on the work being done, the weather, the condition of the roadway, etc. Thus, the driver can set the threshold value when moving over slippery ground so that the four-wheel drive is activated at a low rpm value; when moving on ground with good traction, the four-wheel drive can be activated only at a rather high rpm value, thanks to a corresponding setting. Since these parameters will generally change but seldom during a typical job, manual interventions are seldom needed, if at all.

According to the invention, a change in the value of the threshold gearbox output torque $T\_Ab1$ can also result in a change in the threshold gearbox output torque $T\_Ab2$. This can occur, for example, by an algorithm or a characteristic curve saved in memory in the control system.

For example, when a potentiometer is used to set the threshold value $T\_Ab1$, the following functionalities can be realized in dependence on the potentiometer setting:

End stop 1:
Four-wheel drive is never activated;
End stop 2:
Four-wheel drive is manually activated, and
Region between end stop 1 and end stop 2:
Continuous adjustment of the threshold value $T\_Ab1$.

Thanks to this configuration, no further intervention from the driver is needed so there does not need to be provided, in the vehicle, any foot pedal switch for the manual activation of the four-wheel drive.

According to a further development of the invention, the threshold value for the vehicle speed $v\_1$ can also be adjusted by the driver, similar to the described adjustment of the output torque.

The method of the invention is especially suitable four-wheel loaders in which case the front axle is permanently driven and the rear axle is activated in the manner of the invention to achieve four-wheel drive. In the case of other vehicles, when such is required, the rear axle can be permanently driven and the front axle be activated according to the invention.

BRIEF DESCRIPTION OF THE DRAWING

The invention will now be described, by way of example, with reference to the accompanying drawings in which:

The single FIGURE shows a center pivot steered wheel loader 1 with a front axle 2 and a rear axle 3.

DETAILED DESCRIPTION OF THE INVENTION

The front axle 2 is permanently linked, via the gearbox 4, to the drive motor 5, while the drive motor 5 drives the gearbox 4 via a torque converter. The rear axle 3 can be activated and deactivated by a coupling 6. The activating and deactivating occurs in dependence on the vehicle speed or in dependence on the vehicle speed and the output torque.

REFERENCE NUMERALS 1 wheel loader
2 front axle
3 rear axle
4 gearbox
5 drive motor
6 coupling

The invention claimed is:

1. A method of activating and deactivating a four-wheel drive of one of a service and a working vehicle without interactive differential locks, the method comprising the step of:
   activating and deactivating the four-wheel drive depending on at least one of: a driving condition of the vehicle; and a load condition of the vehicle, derived using an output torque of a gearbox of the vehicle;
   activating the four-wheel drive when at least one of a vehicle speed drops below a first predetermined speed threshold value ($v\_1$), and the gearbox output torque rises above a first predetermined torque threshold value ($T\_Ab1$), and
   deactivating the four-wheel drive when at least one of the vehicle speed rises above a second predetermined speed threshold value ($v\_2$), and when the gearbox output torque drops below a second predetermined torque threshold value ($T\_Ab2$), where the second predetermined speed threshold value ($v\_2$) is larger than the first predetermined speed threshold value ($v\_1$) and the second predetermined torque threshold value ($T\_Ab2$) is smaller than the first predetermined torque threshold value ($T\_Ab1$).

2. The method of activating and deactivating the four-wheel drive according to claim 1, further comprising the step of permitting a driver to set the first predetermined torque threshold value ($T\_Ab1$).

3. The method of activating and deactivating the four-wheel drive according to claim 2, further comprising the step of using one of an algorithm and a characteristic curve, saved in memory in a control system, to change in the value of the first predetermined torque threshold value ($T\_Ab1$) which results in a change in the second predetermined torque threshold value ($T\_Ab2$).

4. The method of activating and deactivating the four-wheel drive according to claim 2 further comprising the step of setting the first predetermined torque threshold value ($T\_Ab1$) using a potentiometer, and realizing the following functionalities in dependence on the potentiometer setting:
   End stop 1:
   four-wheel drive is never activated;
   End stop 2:
   four-wheel drive is manually activated, and
   Region between end stop 1 and end stop 2:
   continuous adjustment of the first predetermined torque threshold value ($T\_Ab1$).

5. The method of activating and deactivating the four-wheel drive according to claim 1, further comprising the step of permitting a driver to set the first predetermined speed threshold value ($v\_1$).

6. The method of activating and deactivating the four-wheel drive according to claim 1, further comprising the step of sensing a rotational speed of a gearbox power take-off using an rpm sensor already present in the gearbox power take-off, while calculating information needed to detect output torque from available variables of drive components.

* * * * *